Oct. 8, 1935.  J. B. KIRBY  2,016,550
FILTER FOR DRY CLEANSING LIQUID
Filed June 28, 1932
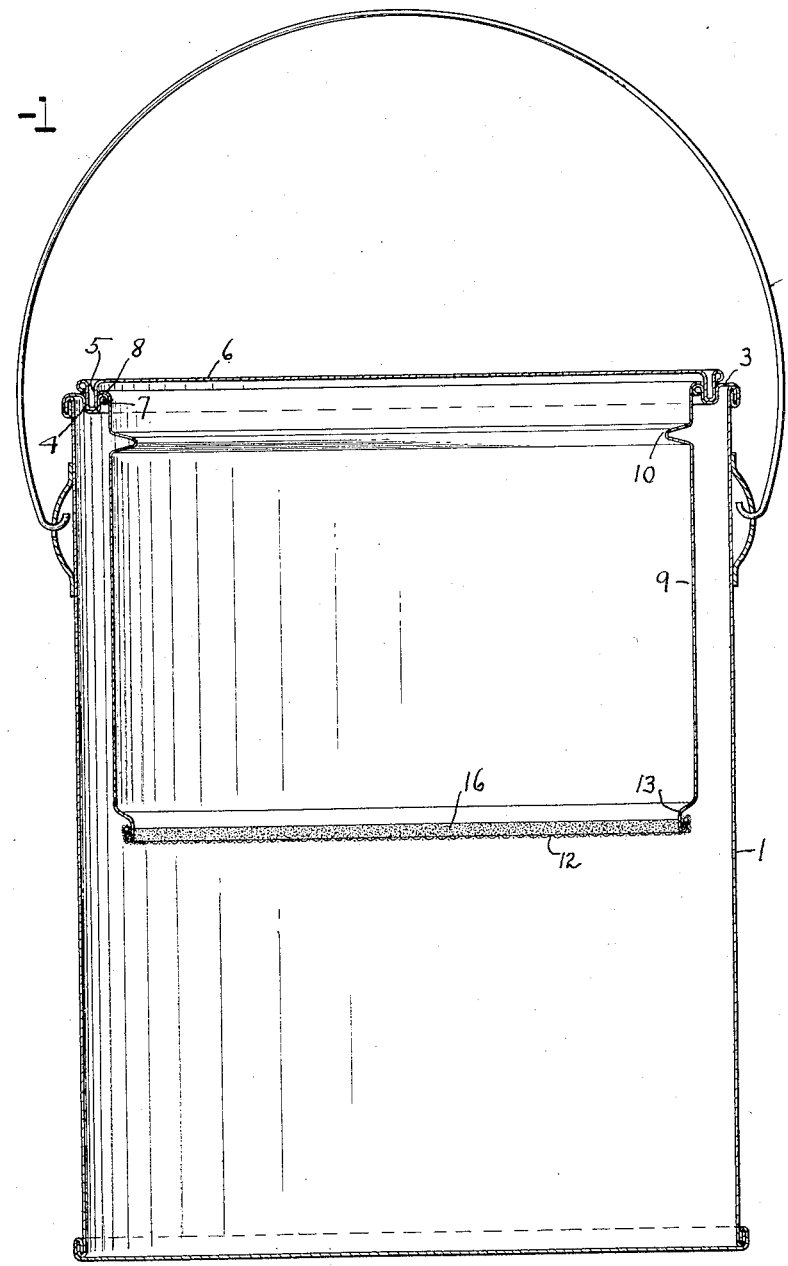
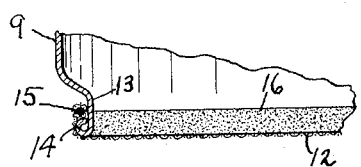
INVENTOR
JAS. B. KIRBY
BY Harold Elmo Smith
ATTORNEY Patented Oct. 8, 1935

2,016,550

UNITED STATES PATENT OFFICE 2,016,550

FILTER FOR DRY CLEANSING LIQUID

James B. Kirby, West Richfield, Ohio, assignor, by mesne assignments, to The Apex Electrical Manufacturing Company, Cleveland, Ohio, a corporation of Ohio, as trustee Application June 28, 1932, Serial No. 619,704

6 Claims. (Cl. 210—155)

This invention relates to filtering devices and has for its object the provision of a simple, inexpensive, compact, and evaporation-proof device of this character for filtering dry cleaning fluids such as gasolene, carbon tetrachloride, methylene, dichloride and the like, non-aqueous fluids such as are employed for dry cleansing furs, silks, wools, and other fabrics. The device is particularly intended for domestic use, though not of course limited thereto and the objects of the invention are the provision of a device of this character which shall serve both as a storage receptacle and filtering receptacle for the substances in question between successive periods of use; another object of the invention is the provision of a device of this character wherein the filtering material can be readily and conveniently renewed; while further objects and advantages of the invention will become apparent as the description proceeds.

In the drawing accompanying and forming a part of this application I have shown a simple and compact embodiment of my inventive idea. Fig. 1 is a vertical sectional view through a complete device; and Fig. 2 is an enlarged detail view of the lower part of the filtering cell.

1 denotes an outer container which may conveniently consist of a common pail having a pivoted bail 2 and formed at its top with an annular ledge 3 provided with an annular groove 4 for the reception of the complementary depending flange 5 of a friction cover 6 whereby the pail can be sealed tightly against the evaporation of its contents while still being readily opened on occasion. Inside the groove 4 the ledge terminates in a circular rim which may be rolled as shown at 7 for added stiffness, and loosely resting on this rim is the outturned lip 8 of a cylindrical filter cell 9 which depends into the receptacle 1. I have shown this cell as provided near its upper end with an inwardly displaced annular flange 10 the better to preserve the circular shape of the cell. It is important that the lip 8 should be entirely free from the cover 6 and also that sufficient looseness should exist between the lip 8 and the rim 7 to permit the ready movement of air.

The cell 9 is preferably made of metal and its lower end is open excepting for the presence of a flat horizontal strainer 12 of cloth or chamois horizontally arranged and securely fastened in any convenient manner to the bottom rim of the cell. Preferably the diameter of the cell is slightly constricted at its lower end as shown at 13 and terminated in a rolled rim 14 over which the cloth is tied as illustrated at 15. This arrangement enables the filter cell to be made of maximum diameter without impeding its ready introduction and removal. For use this strainer is covered with a layer 16 of finely divided mineral matter which constitutes the real filtering agent. Any one of different mineral substances can be employed for this purpose. Finely ground coral is especially good. Finely ground asbestos is entirely satisfactory; and many other substances can be used such for example as bentonite, fuller's earth, pulverized soapstone, finely divided gypsum, etc.

Preferably the capacity of the filter cell is made exactly the same as the capacity of the reservoir beneath the cell, and while I do not limit myself to any exact sizes it is practically convenient for domestic purposes to employ what is known as a two gallon pail, wherefore the capacity of the filter cell is made very nearly one gallon, thus complying with the habit of most users who purchase their dry cleaning fluid in gallon lots. As soon as the fluid has been used it is poured into the filter cell, care being taken to have a layer of fresh mineral matter on the bottom of the same. Of course the impact of the fluid will stir up and disarrange the mineral matter to some extent, but the specific gravity of the same, coupled with the descending tendency of the liquid promptly returns the same to its position on the cloth. The cover 6 is then applied and tightly pressed down, and the pail set away until the fluid shall again be needed. The speed of the filtering process depends to considerable extent upon the contamination which the fluid has received. If the fluid is only slightly contaminated it may all filter through in the course of comparatively short time; if seriously fouled as by the cleansing of badly soiled woolen garments the filtration may take as long as two or three hours. When next the liquid is employed the filter cell is first removed, the flange 10 serving as a convenient handle, and the mineral matter removed by inverting the cell and striking the top edge sharply upon the edge of a box or receptacle. The bottom part of the mineral matter will be found substantially clean and uncolored, although the top may be covered with a greasy, unpleasant layer. The liquid below will be found clear and limpid although in case of serious contamination in its previous use it may have a yellow tinge though not sufficient to stain fabrics.

It is also practical, instead of applying the mineral matter to the cloth strainer at the outset, to mix it with the soiled dry cleansing liquid either before or after it is poured into the filter cell although I prefer the first described method as tending to keep the cloth cleaner and to effect a more thorough filtering of the first portion of the filtrate.

I do not limit myself to the exact shape of either the receptacle or the cell, although I have chosen the shapes which seem to afford the largest capacity. Also I do not limit myself to the employment of cloth or chamois for the strainer 12 since metal or other strainers can obviously be employed. Likewise I do not limit myself to the employment of a friction top of the exact type shown since other tight-fitting covers can be employed; and in general I do not limit myself in any wise except as specifically recited in my several claims which I desire may be construed each independently of limitations contained in other claims.

Having thus described my invention what I claim is:

1. A combined portable storage receptacle and filter for dry cleansing liquids comprising in combination an outer receptacle having an inwardly extending ledge defining a top opening, said outer receptacle being otherwise closed and imperforate, an open-bottomed hollow imperforate shell depending into said receptacle and supported by said ledge, a flat horizontal strainer carried by and traversing the bottom of said shell, a layer of finely divided mineral matter on said strainer, and a removable cover engaging said ledge in leak-tight relation independently of said shell.

2. A combined portable storage receptacle and filter for dry cleansing liquids comprising in combination an outer receptacle having an inwardly extending ledge defining a top opening, said outer receptacle being otherwise closed and imperforate, an open-bottomed hollow imperforate shell depending into said receptacle and supported by said ledge, a flat horizontal strainer carried by and traversing the bottom of said shell, a layer of finely divided mineral matter on said strainer, and a removable cover engaging said ledge in leak-tight relation independently of said shell, the cubic capacity of said shell being substantially the same as the capacity of said receptacle beneath said shell.

3. A combined portable storage receptacle and filter for dry cleaning liquids comprising in combination, an outer receptacle having an inwardly extending ledge defining a top opening, said outer receptacle being otherwise closed and imperforate, an open-bottomed hollow imperforate shell depending into said receptacle and supported by said ledge, filter means in the bottom of said shell, and a removable cover engaging said ledge in liquid-tight relation independently of said shell.

4. A combined portable storage receptacle and filter for dry cleaning liquids comprising in combination, an outer receptacle having an inwardly extending ledge defining a top opening, said outer receptacle being otherwise closed and imperforate, an open-bottomed hollow imperforate shell depending into said receptacle and supported by said ledge, filter means displaceably carried from the lower edge of said shell and forming a perforate bottom therefor, and a removable cover engaging said ledge in liquid-tight relation independently of said shell.

5. A combined portable storage receptacle and filter for dry cleaning liquids comprising in combination, an outer receptacle having an inwardly extending ledge defining a top opening, said outer receptacle being otherwise closed and imperforate, an open-bottomed hollow imperforate shell depending into said receptacle and supported by said ledge, filter means in the bottom of said shell, and a removable cover frictionally engaging said ledge in leak-tight relation and serving to prevent the displacement of said shell in said outer receptacle.

6. A combined portable storage receptacle and filter for dry cleaning liquids comprising in combination, an outer receptacle having a top opening defined by an inwardly extending portion in the form of a channel having an annular ledge extending inwardly therefrom, said outer receptacle being otherwise closed and imperforate, an open-bottomed hollow imperforate shell depending into said receptacle and supported by said ledge, filter means in the bottom of said shell, and a removable cover frictionally received in said channel to provide a liquid-tight cover for said receptacle.

JAMES B. KIRBY.